Sept. 6, 1960 J. A. G. ROBINSON 2,951,370
ILLUMINATED TIRE GAUGE
Filed July 14, 1959
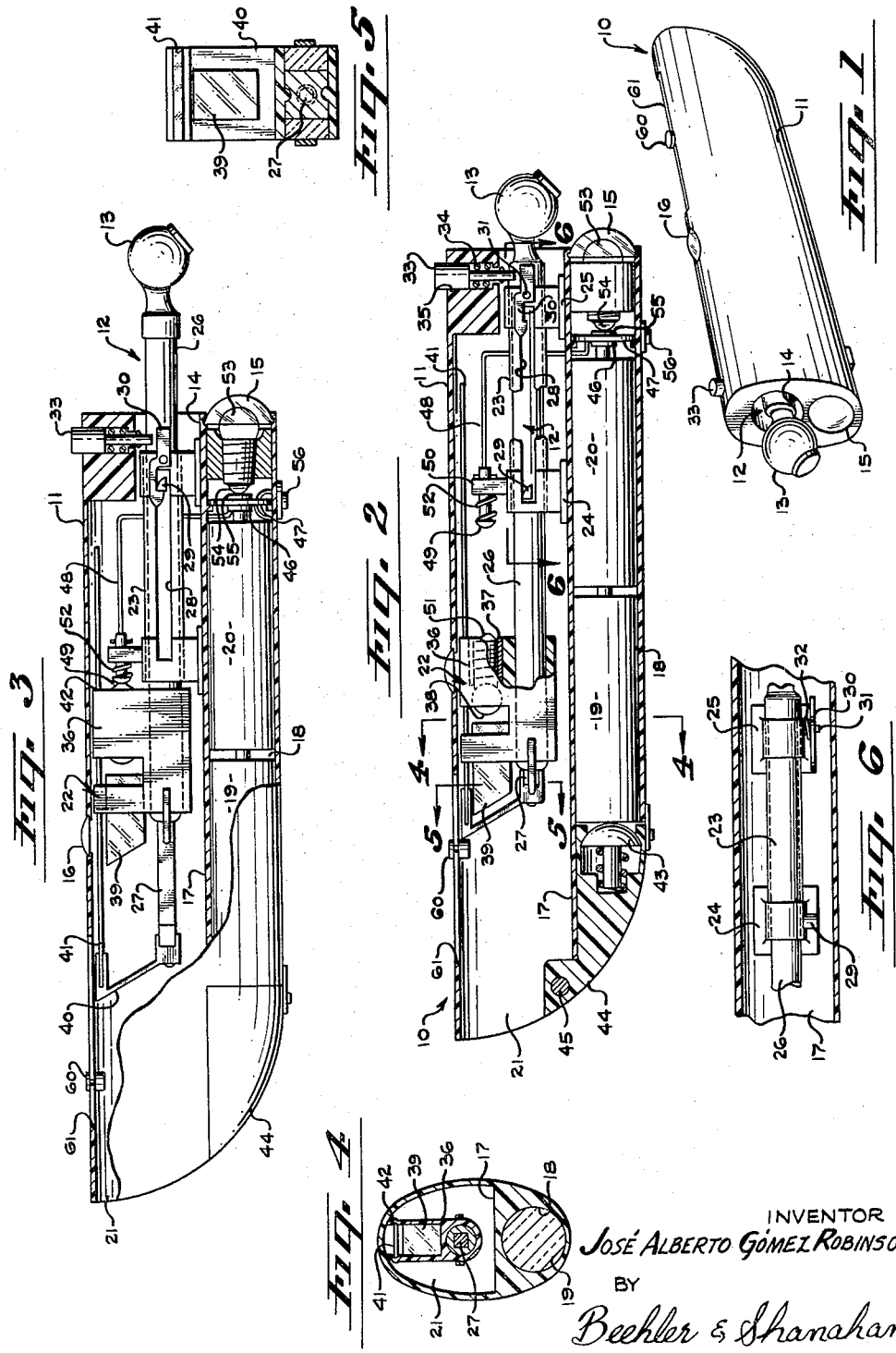
INVENTOR
JOSÉ ALBERTO GÓMEZ ROBINSON
BY
Beehler & Shanahan
ATTORNEYS

United States Patent Office 2,951,370
Patented Sept. 6, 1960

2,951,370
ILLUMINATED TIRE GAUGE

José Alberto Gómez Robinson, Calle 19 Ave. 16 #43, Guaymas, Sonora, Mexico

Filed July 14, 1959, Ser. No. 826,980

4 Claims. (Cl. 73—389)

This invention relates generally to illuminated tire gauges, and more particularly to one in which a pressure gauge carried in a retracted position in a housing, may be partially withdrawn for use, and when withdrawn, latches into a position in which an internal illumination means carried on the gauge is held resiliently against a spring mounted electrical contact, thereby causing the illumination means to transmit light through a translucent scale and a reading window in the side of the housing.

In sports car racing, it is critically important to maintain, or slightly increase or decrease tire pressure, depending upon speed, road surface conditions, temperature, etc. Since a substantial part of long road races takes place at night over unlighted highways, the pressure checking must be done by means of a flashlight. At the present time, checking tire pressure by means of a pressure gauge in one hand and a flashlight in the other is so slow and clumsy a process that precious minutes are often lost. Also, pressure can easily be misread. The same considerations which apply to road racing are also important to anyone who must drive an automobile for long distances over unlighted highways at night.

Gauges for detecting tire pressure are usually comprised of tubular cylinders with a pressure detecting inlet valve at one end, and a graduated slider reciprocable in the opposite end by the detected air pressure. When these gauges are thrown into a tool kit or glove compartment, dirt and oil tends to accumulate on the slider, with consequent impairment of the accuracy of the gauge, and difficulty in reading the graduated slider. Also, the gauge is small enough to become easily lost among tools.

A person using a pressure gauge and flashlight at night finds it necessary to illuminate two different areas, thus requiring shifting of the light: first, the light must be thrown on the valve from which the valve cap is to be removed and the pressure gauge detection head is to be applied; secondly, the light must be turned from the tire valve to the gauge slider in order to read the pressure.

The major object of the present invention is to provide a combination flashlight and tire pressure gauge by means of which pressure readings can be taken at night without any other source of lumination.

It is another major object of the invention to provide a self-illuminated pressure gauge in which the graduated scale moves within a housing by which it is protected from dirt which would interfere with its operation or the reading of its scale.

It is an important feature of the combination flashlight and pressure gauge of this invention that the scale-illuminating light is locked into a reading position in which it is urged resiliently against a spring mounted electrical contact within the device. A releasable latching means is used to hold the gauge and its associated illumination means against the spring action of the electrical contact.

Finally, it is a feature of the invention that the instrument can be handled entirely in one had, and light can be thrown upon the tire valve by means of a separate external flashlight bulb, by pressing a button which diverts some of the battery power from the gauge illumination to the external flashlight.

The foregoing and other features and advantages of the invention will be understood from the following description, taken in connection with the accompanying drawings, in which:

Figure 1 is a perspective view of an illuminated tire gauge constructed according to the invention;

Figure 2 is a longitudinal sectional view through the illuminated tire gauge of Figure 1, showing some internal parts partly broken away to reveal their structure;

Figure 3 is a side elevational view of the illuminated tire gauge, partially broken away to reveal a longitudinal sectional view like that revealed in Figure 2, but with the pressure gauge extending from the right end of the device in position for use in reading the pressure of a tire;

Figure 4 is a transverse sectional view of the gauge of Figure 2, as viewed in the direction of the arrows 4—4 in Figure 2;

Figure 5 is a transverse sectional view of part of the left end of the pressure gauge, as viewed in the direction of the arrows 5—5 in Figure 2; and Figure 6 is a sectional view showing the mounting in which the pressure gauge is reciprocable, as viewed in the direction of the arrows 6—6 in Figure 2.

In Figure 1, a tire gauge constructed according to the invention, and indicated generally by the numeral 10, is seen to be enclosed in a housing 11, which is an elongated cylinder of somewhat elliptical transverse cross-section. A pressure gauge, indicated generally by the arrow 12, similar to standard tire pressure gauges is carried within the upper part of the housing 11, with its pressure detection valve end 13 projecting from an end opening 14 in the housing 11.

Just below the end opening 14, a flashlight lens 15 is located in a position to throw an illuminating light directly forward of the tire gauge 10 to illuminate a tire valve to which detection valve end 13 is applied, when the latter has been extended to use position as will be described hereinafter in connection with Figure 3.

Another glass lens 16 is seen on the upper back side of the housing 11, about mid-point of the length thereof. As will be explained hereinafter, an illuminated reading of the pressure indicated by the gauge 12 can be read through lens 16.

During storage or transportation, when the tire pressure gauge 10 is not in use, or is being used only as a flashlight, the pressure gauge 12 is carried in a position in which it is retracted into the interior of the housing 11, as seen in Figures 1 and 2, but when it is desired to read a tire pressure, the pressure gauge 12 is grasped by the detection valve end 13 and manually pulled from the housing 11 into an extended position as illustrated in Figure 3.

Figures 2 and 3 reveal that the interior of the housing 11 is separated by a partition 17 into a lower battery chamber 18, containing flashlight batteries 19 and 20, and an upper pressure gauge chamber 21, containing the pressure gauge 12 and its associated illumination means, indicated generally by the numeral 22.

It will also be seen from Figures 2 and 3, that the pressure gauge 12 is manually reciprocable in a tubular guide 23, which is supported within the pressure gauge chamber 21 by means of a pair of supports 24 and 25 spaced a short distance from each other, but both located in the vicinity of the opening 14. The guide tube 23 is shown partially broken away in Figure 2, for purposes of illustration, but is completely illustrated in Figures 3 and 6.

The principal working parts of the pressure gauge 12, in addition to the pressure detection valve end 13, are the barrel 26, and a plunger 27, the latter being movable from the former in proportion to the air pressure detected by the pressure detection valve 13.

The side of the tubular guide 23 is slotted by slot 28 to accommodate a stud 29, which moves from the left to the right end of the slot 28 when the pressure gauge 12 is extracted from housing 11 for use, as illustrated in Figure 3.

A hook latch 30 is pivotally mounted at 31 on the side of the tubular guide 23, and urged clockwise by a spring 32 (see Figure 6) to engage the stud 29, when the pressure gauge 12 is extended, as illustrated in Figure 3.

A release button 33, biased by a spring 34 is mounted in bore 35 in the housing 11, just above the hook latch 30, to provide a means for finger release of the latch 30 from the position of Figure 3, when it is desired to retract the pressure gauge 12 back into the housing, in the retracted position illustrated in Figure 2.

In Figure 2, the partially sectioned side view of the illumination means 22 reveals that it is integrally mounted on the left end of the barrel 26 of the pressure gauge 12, and is comprised of a mounting support 36, a flashlight socket 37, flashlight bulb 38 mounted in flashlight socket 37, and a translucent reflecting prism 39 carried in the mounting support 36 just to the left of the flashlight bulb 38.

As seen in Figure 3, when the pressure gauge 12 is extended into use position, the illumination means 22 is moved sufficiently to the right so that light from the bulb 38 will be reflected by the prism 39 through scale reading window 16.

The moveable, pressure-indicating plunger 27 of the pressure gauge 12 carries a scale bracket 40 on its external end, and scale bracket 40 in turn is attached to the end of a translucent pressure scale 41, which reciprocates in a slotted passage 42, in illumination means mounting block 36, as best illustrated in the transverse sectional view of Figure 4.

The transverse sectional view of Figure 5 also reveals the mounting construction of scale bracket 40, which is attached to the plunger 27, and the end of the translucent scale 41.

The scale illumination bulb 38 is powered by the batteries 19 and 20. The ground terminal of the batteries is urged against spring actuated grounding button 43 (see Figure 2) which also serves as a snap closure means for the cover 44, pivoted at 45, which provides access to the battery compartment 18.

The positive terminal of battery 20 is urged against a metal button 46 mounted in an insulating support 47, which communicates by insulated wire 48 to a scale illumination contact button 49.

The contact button 49 is longitudinally slidable in a button support 50, which is mounted on the tubular guide support 24, and is urged toward the end contact 51 of the light bulb 38 by a helical spring 52. A flashlight bulb 53, mounted behind the flashlight lens 15 has its terminal end 54 urged against a metal contact button 55, which can be connected to the batteries 19 and 20 by means of button 56.

In operation, it will be seen from Figure 3 that the spring 52 of the electrical contact button 49 cooperates with the latch 30 to hold the pressure gauge 12 firmly in use position, with the illumination means 22 opposite the scale reading window 16, and the scale illuminating bulb 38 firmly in contact with the electrical contact 49.

The operator can take his tire pressure readings with one hand only. The pressure gauge 12 is manually pulled into the extended position illustrated in Figure 3, and one finger pressed on the flashlight button 56, until the pressure detecting head 13 has been firmly placed on the tire valve.

The tire pressure causes the pressure gauge plunger 27 to be expelled from the pressure gauge barrel 26, as illustrated in Figure 3, also causing the translucent pressure scale 41 to be slid in guide slot 42 a distance sufficient to place calibrations on the scale 41, corresponding to the detected pressure, opposite the scale reading window 11.

Before making the next pressure reading, it is necessary to push the plunger 27 back into the barrel 26. This is accomplished by means of a slider button 60 (seen in Figures 1, 2, and 3) which can be manually slid longitudinally with respect to the housing 11 in a slot 61. The inner end of slider button 60 engages the scale bracket 40 and pushes both scale and plunger 27 back into a starting position as illustrated in Figure 2.

When readings have been completed, the pressure gauge 12 can be manually pushed back into retracted position as illustrated in Figure 2, but only after the latch 30 has been released by pressing latch release button 33.

It will be understood that the foregoing description has been presented in detail in order to meet the requirement of the patent law that a specific embodiment be illustrated and described, and not for the purpose of limiting the scope of the invention to the particular details described or illustrated. On the contrary, I intend that all modifications and improvements which embody the spirit of the invention and fall within the limits defined by the appended claims be considered as part of the invention.

Having thus described my invention, what I claim as new and desire to secure by Letters Patent is:

1. An illuminated tire gauge which includes: an elongated housing having a gauge-receiving opening in one end; a pressure gauge longitudinally reciprocable in said housing between a retracted position within said housing and a use position with the gauge partially extended from said housing through said opening; a gauge-reading window in the side of said housing; illumination means carried on said gauge within said housing and carried into alignment with said window when said gauge is extended from said opening into use position; translucent scale means for indicating pressure, said scale means being moveable between said illumination means and said window by said pressure gauge; and a battery means connecting to said illumination means when said gauge is moved to the use position.

2. An illuminated tire gauge which includes: an elongated housing having a gauge-receiving opening in one end; a pressure gauge having a pressure detection head, said gauge being longitudinally reciprocable in said housing between a retracted position within said housing and a use position with said pressure detection head extended from said housing through said opening; a gauge-reading window in the side of said housing; illumination means carried on said gauge within said housing and carried into alignment with said window when said gauge is extended from said opening into use position; translucent scale means for indicating pressure, said scale means being moveable between said illumination means and said window by said pressure gauge; an electrical contact means resiliently mounted within said housing for engagement with said illumination means when said gauge is extended into use position; releasable latch means for locking said pressure gauge in extended position with said illumination means held against said resiliently mounted electrical contact; and battery means within said housing for supplying electrical power to said illumination means.

3. An illumiated tire gauge which includes: an elongated housing having a gauge-receiving opening in one end; a pressure gauge having a pressure detection head, said gauge being longitudinally reciprocable in said housing between a retracted position within said housing and a use position with said pressure detection head extended from said housing through said opening; a gauge-reading window in the side of said housing; illumination means carried on said gauge within said housing and carried into alignment with said window when said gauge is extended from said opening into use position; translucent scale means for indicating pressure, said scale means being moveable between said illumination means and said window by said pressure gauge; an electrical contact means resiliently mounted within said housing for engagement with said illumination means when said gauge is extended into use position; releasable latch means for locking said pressure gauge in extended position with said illumination means held against said resiliently mounted electrical contact; external illumination means adjacent said opening and directed toward said pressure detection head when said pressure gauge is extended into said use position; battery means within said housing; and switch means for diverting electrical power from said battery means to said external illumination means.

4. An illuminated tire gauge which includes: an elongated housing having a gauge-receiving opening in one end; a pair of bearing mounts within said housing in alignment with said opening; a pressure gauge longitudinally reciprocable in said bearing mounts between a retracted position within said housing and a use position with the gauge partially extended from said housing through said opening; a gauge-reading window in the side of said housing; an illumination means support carried on the inner end of said gauge; illumination means including an illumination bulb carried on said illumination support; a reflecting means mounted on said illumination support near said bulb and transported into alignment with said window when said gauge is extended from said opening into use position; translucent scale means for indicating presusre, said scale means being reciprocable between said reflecting means and said window by the operation of said gauge; an electrical contact means resiliently mounted on one of said bearings and contacting said illumination means when said gauge is extended into use position; releasable latch means mounted on one of said bearings for locking said pressure gauge in extended position with said illumination means held against said resiliently mounted electrical contact; and battery means within said housing connected to said contact means.

References Cited in the file of this patent

UNITED STATES PATENTS

| | | |
|---|---|---|
| 1,222,948 | Hawthorn | Apr. 17, 1917 |
| 1,923,776 | Crowley | Aug. 22, 1933 |
| 2,491,385 | Marcum | Dec. 13, 1949 |
| 2,797,308 | Best et al. | June 25, 1957 |